United States Patent
Viegas et al.

(10) Patent No.: US 9,558,275 B2
(45) Date of Patent: Jan. 31, 2017

(54) ACTION BROKER

(71) Applicant: Microsoft Technology Licensing, LLC, Redmond, WA (US)

(72) Inventors: Evelyne Viegas, Redmond, WA (US); Varish Mulwad, Baltimore, MD (US); Patrick Pantel, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 548 days.

(21) Appl. No.: 13/713,197

(22) Filed: Dec. 13, 2012

(65) Prior Publication Data

US 2014/0172412 A1    Jun. 19, 2014

(51) Int. Cl.
G06F 17/27    (2006.01)
G06F 17/30    (2006.01)

(52) U.S. Cl.
CPC .............. *G06F 17/30864* (2013.01)

(58) Field of Classification Search
None
See application file for complete search history.

(56) References Cited

U.S. PATENT DOCUMENTS

| 7,158,966 | B2 | 1/2007 | Brill |
| 7,571,108 | B1* | 8/2009 | Leban ............... G06Q 10/06316 705/7.13 |
| 7,681,203 | B2 | 3/2010 | Mandato |
| 7,716,163 | B2 | 5/2010 | Reynar |
| 7,725,322 | B2 | 5/2010 | Kwak |
| 8,165,886 | B1* | 4/2012 | Gagnon ................ G10L 15/26 704/275 |

(Continued)

FOREIGN PATENT DOCUMENTS

JP    2012039581 A    2/2012

OTHER PUBLICATIONS

Pantel, et al., "Mining Entity Types from Query Logs via User Intent Modeling"—Published Date: Jul. 8, 2012 Proceedings: The 50th Annual Meeting of the Association for Computational Linguistics, pp. 9 http://research.microsoft.com/pubs/169626/P12-1059%5B1c/o5D.pdf.

(Continued)

*Primary Examiner* — Richemond Dorvil
*Assistant Examiner* — Thuykhanh Le
(74) *Attorney, Agent, or Firm* — Florin C. Corie; Sandy Swain; Micky Minhas

(57) ABSTRACT

Among other things, one or more techniques and/or systems are provided for building an action catalogue, generating an action frame for an action within the action catalogue, and/or executing an action. In an example, an action may be included within the action catalogue based upon descriptive text associated with an application indicating that the application is capable of performing the action (e.g., a movie app may be capable of performing an order movie tickets action). A parameter (e.g., a movie name) and/or an execution endpoint (e.g., a uniform resource identifier used to access movie ticket ordering functionality) may be used to generate an action frame for the action. In this way, user intent to perform an action may be identified from user input (e.g., a spoken command), and the action may be performed (e.g., on behalf of the user with minimal additional user input) by using the action frame.

20 Claims, 8 Drawing Sheets

(56) References Cited

U.S. PATENT DOCUMENTS

| | | | |
|---|---|---|---|
| 8,620,658 B2* | 12/2013 | Nakade | G10L 15/30 704/10 |
| 2004/0030556 A1* | 2/2004 | Bennett | G06F 17/27 704/270 |
| 2005/0192992 A1 | 9/2005 | Reed et al. | |
| 2006/0069546 A1* | 3/2006 | Rosser | G10L 13/00 704/9 |
| 2007/0050191 A1* | 3/2007 | Weider | G06F 17/30864 704/275 |
| 2007/0118514 A1* | 5/2007 | Mariappan | G06F 17/30864 |
| 2007/0265850 A1* | 11/2007 | Kennewick | G10L 15/22 704/257 |
| 2008/0104037 A1* | 5/2008 | Bierner | G06F 17/3064 |
| 2009/0070306 A1* | 3/2009 | Stroe | G06F 17/30887 |
| 2009/0077047 A1* | 3/2009 | Cooper | G06F 17/2785 |
| 2009/0150156 A1* | 6/2009 | Kennewick | G06Q 30/0261 704/257 |
| 2009/0254539 A1* | 10/2009 | Wen | G06F 17/30247 |
| 2009/0292687 A1* | 11/2009 | Fan | G06F 17/30654 |
| 2010/0070448 A1 | 3/2010 | Omoigui | |
| 2010/0198837 A1* | 8/2010 | Wu | G06F 17/30672 707/748 |
| 2011/0029541 A1* | 2/2011 | Schulman | G06F 17/30864 707/748 |
| 2011/0313773 A1* | 12/2011 | Yamada | G10L 17/26 704/270 |
| 2012/0124028 A1* | 5/2012 | Tullis | G06F 8/60 707/711 |
| 2012/0131033 A1 | 5/2012 | Bierner | |
| 2012/0143904 A1* | 6/2012 | Ainslie | G06F 9/44505 707/769 |
| 2013/0041921 A1* | 2/2013 | Cooper | G06F 17/30672 707/780 |
| 2013/0103391 A1* | 4/2013 | Millmore | G06F 17/27 704/9 |
| 2013/0124492 A1* | 5/2013 | Gao | G06F 17/2818 707/706 |
| 2013/0138424 A1* | 5/2013 | Koenig | G06F 17/271 704/9 |
| 2013/0166303 A1* | 6/2013 | Chang | G06F 17/30787 704/258 |
| 2013/0179145 A1* | 7/2013 | Patel | G06F 17/30867 704/3 |
| 2013/0238326 A1* | 9/2013 | Kim | G06F 3/167 704/231 |
| 2014/0067579 A1* | 3/2014 | Herger | G06Q 10/06 705/26.1 |
| 2014/0136187 A1* | 5/2014 | Wolverton | G06F 17/30654 704/9 |
| 2014/0156278 A1* | 6/2014 | Kennewick | G06Q 30/0261 704/254 |

OTHER PUBLICATIONS

Hu, et al., "Understanding User's Query Intent with Wikipedia"—Published Date: Apr. 20, 2009, Proceedings: 18th Intl. World Wide Web Conf., pp. 10, http://www.ra.ethz.ch/cdstore/www2009/proc/docs/p471.pdf.

Lin, et al., "Active Objects: Actions for Entity-Centric Search".—Published Date: Apr. 16, 2012, Proceedings: Proceedings of the 21st international conference on World Wide Web, pp. 10 http://research.maicrosoft.com/pubs/161389/ActiveObjects_www2012.pdf.

Int. Search Report cited in PCT Application No. PCT/US2013/075160 dated Aug. 4, 2014, 12 pgs.

"Supplementary European Search Report received for European Patent Application No. 13818581.4", Mailed Date: Jan. 15, 2016, 4 pages.

"Office Action Issued in European Patent Application No. 13818581.4", Mailed Date: Feb. 9, 2016, 6 Pages.

Examination Report issued in European Patent Application No. 13818581.4 mailed Sep. 11, 2016.

* cited by examiner

ACTION BROKER

BACKGROUND

Many users utilize computing devices, such as mobile phones, tablet devices, and/or personal computers, to perform various types of actions. In one example, a user may input a speech command "what is today's news" into a mobile phone. The mobile phone may provide the user with a list of news website search results through a web browser. In another example, a user may input a search query "order movie tickets" through a search engine accessed through a tablet device. The search engine may provide a list of websites that may be tagged as relating to movie tickets. The user may manually explore a movie website that may provide movie information, such as movie reviews, movie show times, and/or a movie ticket ordering service. After discovering the ticket ordering service, the user may provide information requested by the ticket order service in order to complete an order ticket movie action. Unfortunately, completing the order ticket movie action may require extensive manual input, searching, trial and error, and/or input of redundant information. Moreover, finding a movie ticket ordering provider may be difficult, particularly if the provider is an app instead of a webpage, because search engines generally do not know the actions afforded by apps.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for generating an action catalogue, generating an action frame, and/or executing an action are provided herein. In an example of generating an action catalogue, one or more candidate actions may be identified and/or validated as actions for inclusion within the action catalogue. For example, descriptive text associated with an application (e.g., an application description provided through an application marketplace, a user review for the application, a website associated with the application, etc.) may be mined and/or parsed to identify a candidate action provided by the application. For example, an application marketplace may provide users with access to a restaurant application. The application marketplace may have an application description for the restaurant application (e.g., "This application allows users to reserve tables, read reviews, and/or view menus. We hate expensive food so take a look at the app's coupons"). A candidate action, such as a view menu candidate action and/or a hate expensive candidate action, may be identified. A feature vector may be generated from the candidate action based upon one or more content sources (e.g., a website, the application marketplace, an article, a second application, a video, a user review, a blog, etc.) referencing the candidate action (e.g., a dinning website may mention that "users want to view menus before visiting a restaurant"). A classifier may be used to determine, based upon the feature vector, whether the candidate action is valid or invalid (e.g., a view menu candidate action may be determined as valid, while a hate expensive candidate action may be determined as invalid). Responsive to the candidate action being valid, the candidate action may be included as an action within the action catalogue.

In an example of generating an action frame, a provider (e.g., a website, an application, a widget, a web service, a cloud service, functionality provided by an application form or a web form, etc.) capable of executing the action may be identified. For example, a restaurant website may comprise an action form (e.g., a web form) that may provide menu viewing functionality. The action form may comprise one or more parameters for which values may be specified in order to view a menu (e.g., a restaurant name parameter). One or more parameters may be extracted from the action form, and may be populated within the action frame. In this way, the action frame may be populated with one or more parameters used to execute the action.

In an example of executing an action, user input (e.g., a search query for a consumer product, an implicit query derived from prior user behavior such as ordering tacos every Friday at 5:00, speech input requesting movie reviews, a calendar entry specifying a dinner date, a task entry specifying a need to buy a snow blower, an email indicating user interest in getting dinner, a social network post indicating a desire to see a movie, etc.) may be analyzed to identify a user intent to perform an action. An action frame for the action may be identified based upon the user intent. The action frame may specify one or more parameters used to execute the action (e.g., a restaurant name parameter for a view menu action). The action frame may specify an execution endpoint (e.g., a uniform resource identifier (URI) of a provider capable of executing the action). If the action frame specifies at least one parameter, then one or more parameters may be obtained from the user input (e.g., parse results from the search query), a default value (e.g., where no parameter is provided by the user), and/or a user response to a solicitation for the value. If the action frame does not specify at least one parameter, then no parameters may be obtained. The provider may be invoked, using the execution endpoint URI, to execute the action (e.g., based upon the value of the parameter). In this way, the action may be performed on behalf of the user with reduced manual input, searching, trial and error, and/or input of redundant information, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
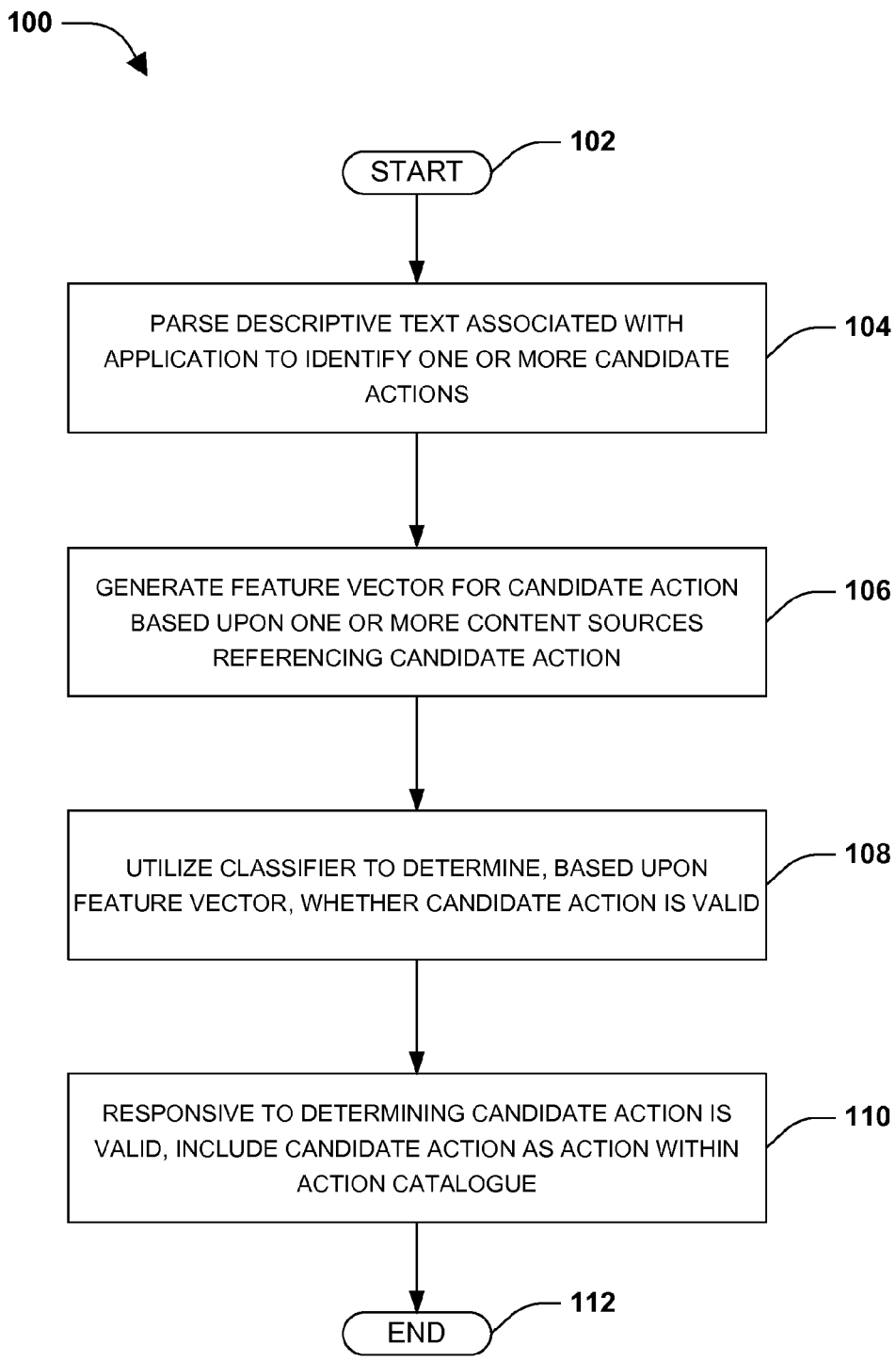
FIG. 1 is a flow diagram illustrating an exemplary method of generating an action catalogue.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of generating or building an action catalogue is illustrated by an exemplary method 100 of FIG. 1. At 102, the method starts. At 104, descriptive text associated with an application may be parsed to identify a candidate action provided by the application. The descriptive text may comprise a variety of text, such as an application marketplace user review for the application, a web-based user review for the application, a blog or news article about the application, an application description of the application, and/or a variety of other textual or non-textual sources. For example, a car website may provide a car app description of a newly released mobile car app that allows users to obtain car quotes, read user car reviews, browse car images, and/or discuss paint options, such as a red paint that is endorsed or loved by the car website. In an example of parsing the descriptive text, a tokenization technique may be used to generate one or more tokens from the descriptive text (e.g., tokens representing words and/or phrases parsed from the car app description). A natural language processing (NLP) technique may be used to identify one or more parts of speech tags (e.g., a noun, a verb, and adjective, etc.) from at least some of the one or more tokens. In an example, an NLP technique may be used to identify phrase chunks that may be used with part of speech (POS) tags in order to identify noun phrases (e.g., "theater tickets in New York City" may be identified as a noun phrase from "book cheap theater tickets in New York City"). In another example, one or more syntactic structures may be identified, and may be used in identifying a candidate action. In this way, a candidate action, such as an obtain car quotes candidate action and a love red paint candidate action, may be constructed based upon at least one part of speech tag.

At 106, a feature vector may be generated for the candidate action based upon one or more content sources (e.g., a website, an application market place description, a web service, a cloud service, an application, an article, a blog, a social network, an email, a calendar entry, a task entry, etc.) referencing the candidate action. It may be appreciated that a content source referencing a candidate action may correspond to a variety of information from various content sources, such as a local description of an application for an application marketplace, a review of the application from a website, content from a web page (e.g., a number of times a web searching index found a pattern "candidate action at URL"), a POS sequence (e.g., a verb+10 nouns may be less likely to be an action than a verb+noun+preposition+noun), a dictionary or web encyclopedia (e.g., a dictionary or web encyclopedia may define an action object, such as a noun phrase), etc. In an example, an action name of "read_movie_reviews" may be evaluated to identify an action verb of "read" (e.g., an action that may be performed on an action object) and an action object of "movie reviews" and/or "movie" (e.g., an object upon which an action may be performed). In this way, the action verb and the action object may be combined into an action frame (e.g., read movie reviews, which may be distinguishable from read book reviews).

In an example, a first feature vector may be generated for the obtain car quotes candidate action based upon one or more features extracted from a plethora of content sources comprising content and/or functionality referring to obtaining car quotes. In another example, a second feature vector may be generated for the love red paint candidate action based upon one or more features that may be extracted from content (e.g., few to no content sources may refer to the love red paint candidate action as an action that a user may want to perform). In an example, a feature may correspond to a number feature (e.g., a number of times an action object occurs in a candidate object for known applications), a category feature (e.g., action verb X occurs in pattern "X at URL" for respective URLs), a binary feature (e.g., a binary conversion of a category feature) and/or other types of features.

At 108, a classifier (e.g., a machine learning classifier) may be utilized to determine, based upon the feature vector, whether the candidate action is valid or invalid. For example, the obtain car quotes candidate action may be determined as valid (e.g., based upon a number of features and/or a number of feature occurrences, associated with content sources, being above a threshold), while the love red car paint candidate action may be determined as invalid (e.g., based upon a number of features and/or a number of feature occurrences, associated with content sources, being below the threshold). In this way, responsive to determining the candidate action is valid, the candidate action may be included as an action in the action catalogue, at 110. For example, the obtain car quotes candidate action may be included as an obtain car quotes action within the action catalogue. In this way, information mined from descriptive text may be used to build the action catalogue with one or more actions that a user may want to perform through a computing device. At 112, the method ends.

In an example, an action frame may be generated for an action, such as the action included within the action catalogue. For example, a provider capable of executing the action may be identified (e.g., a website that provides a web form used to obtain car quotes, an application that provides an application form used to obtain car quotes, a web service providing car quote functionality, etc.). One or more parameters may be extracted from an action form (e.g., a web form, an application form, a user interface through which a user may specify values for one or more parameters used to execute the action, etc.). A parameter may correspond to information used to perform the action. For example, a car model parameter (e.g., a parameter used to execute the action) and/or a user location optional parameter (e.g., an optional parameter that may provide useful information for execution) may be extracted from an application form of a car purchasing application. In an example, an application programming interface (API) associated with the provider, such as the car purchasing application, may be mapped to the action frame. An execution endpoint, such as a uniform resource identifier (URI), associated with the API may be generated. The action frame may be populated with the execution endpoint URI. In an example, the action frame may be populated with one or more execution endpoints, which may be ranked based upon various factors, such as reliability, functionality robustness, user review, trust, marketplace registration, etc. In this way, the action frame may be populated with one or more parameters and/or execution endpoints that may be used to execute the action, such as on behalf of a user (e.g., exemplary method 200 of FIG. 2).

Figure 2:
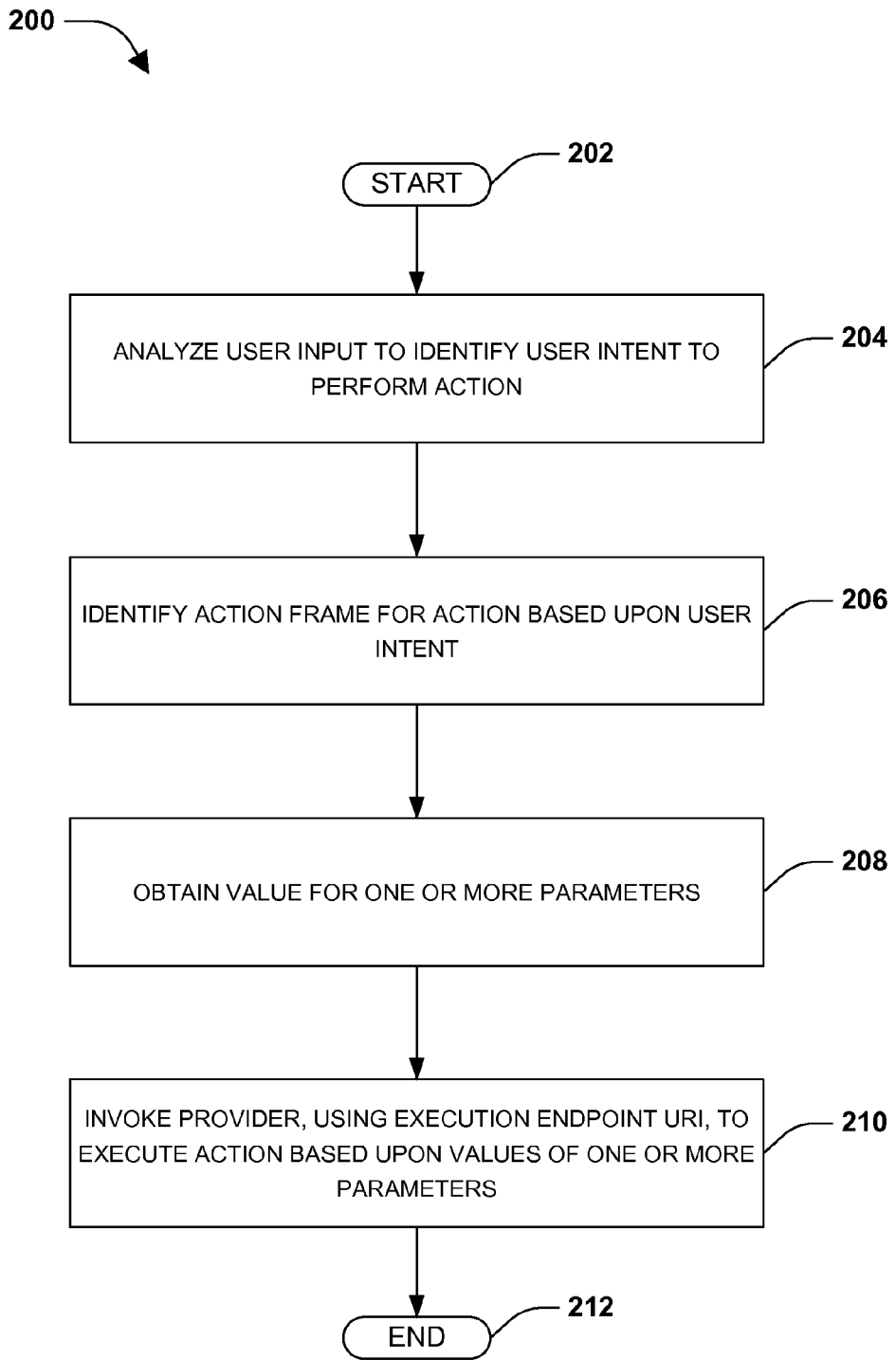
FIG. 2 is a flow diagram illustrating an exemplary method of executing an action.

An embodiment of executing an action is illustrated by an exemplary method 200 of FIG. 2. At 202, the method starts. At 204, user input (e.g., speech input, a search query, an email, a task entry, a social network post, a calendar entry, and/or other input associated with a computing device, such as a personal computing device, a tablet device, a mobile device, a car computing device, etc.) may be analyzed to identify a user intent to perform an action (e.g., the obtain car quote action of FIG. 1). For example, a calendar entry within a user calendar may specify "need to find price for Sports Car Model X". A user intent to obtain a car quote for the Sports Car Model X may be identified from the calendar entry. As another example, an implicit query (e.g., or serendipitous query) may be used to identify user intent. For example, if a user has purchased tacos around noon on Tuesday for the last 5 weeks, then, on the following Tuesday, user intent to order tacos for lunch may be inferred (e.g., as the result of an implicit query "eat tacos near here" could automatically be displayed on the user's mobile phone).

At 206, an action frame for the action may be identified based upon the user intent. The action frame may specify one or more parameters corresponding to information used to perform the action and/or an execution endpoint, such as a uniform resource identifier (URI) associated with an application programming interface (API), of a provider capable of executing the action. For example, an action frame for the obtain car quote action may be identified. The action frame may comprise a car model parameter, a user location optional parameter, and/or other parameters used to execute the obtain car quote action. The action frame may comprise one or more ranked execution endpoints, such as an execution endpoint URI of a car purchasing application, which may be invoked to execute the action. At 208, a value for a parameter may be obtained based upon the user input (e.g., Sports Car Model X may be identified from the calendar entry, and may be used as a value for the car model parameter), a default value (e.g., a default value specifying that a current location of a user computing device is to be used for the user location optional parameter), and/or a user response to a solicitation for the value (e.g., the user may be provided with an ability to specify one or more car options for the Sports Car Model X). In an example, a provider may utilize merely a subset of parameters specified within an action frame (e.g., a registered provider may utilize a first subset of the parameters, while an un-registered provider may utilize a second (e.g., greater) subset of the parameters that is different than the first subset).

At 210, the provider may be invoked using the execution endpoint URI to execute the action based upon values obtained for the one or more parameters. In an example, the provider may be selected (e.g., over a second provider specified within the action frame) based upon the provider having a ranking above an execution rank threshold (e.g., a rank that is relatively higher than a rank of the second provider) and/or a user preference for the provider. A result of the executed action may be provided. For example, digital content (e.g., a car quote, a dealership phone number, a car review, car pricing data, car dealership listings, etc.), a purchase receipt (e.g., an offer or acceptance of a car purchase), and/or a reservation receipt (e.g., a reservation to test drive the car at a location dealership) may be provided (e.g., with little to no additional user input). In another example, instead of invoking the provider on behalf of a user, a result set of one or more providers capable of executing the action may be provided to the user so that the user may take appropriate action (e.g., download and install an application, specified within the result set, from an application marketplace). In this manner, 210 may be optional in an example. At 212, the method ends.

Figure 3:
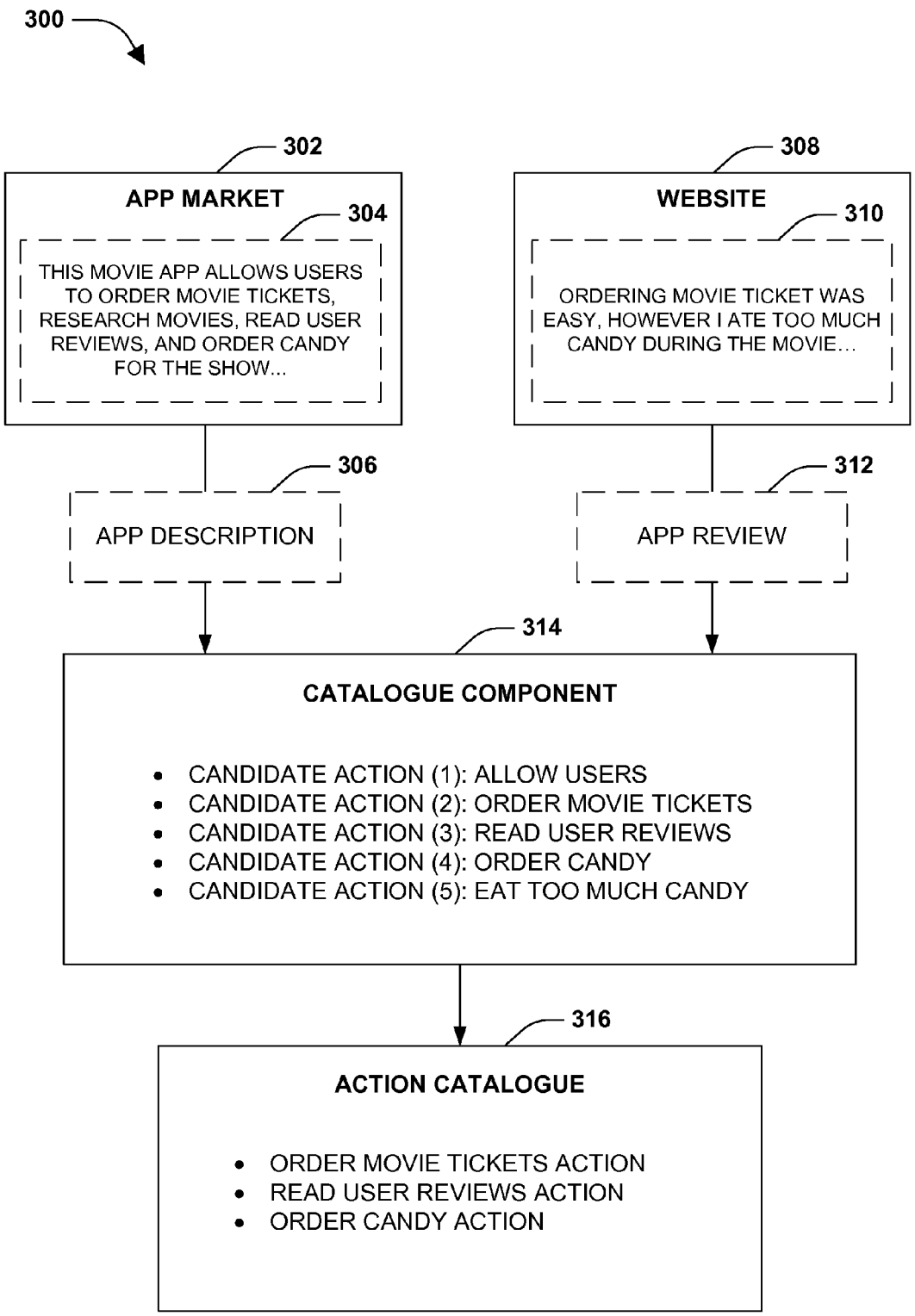
FIG. 3 is a component block diagram illustrating an exemplary system for generating an action catalogue.

FIG. 3 illustrates an example of a system 300 configured for generating or building an action catalogue 316. The system 300 may comprise a catalogue component 314. The catalogue component 314 may be configured to build the action catalogue 316 by populating the action catalogue 316 with one or more actions. The catalogue component 314 may be configured to parse descriptive text associated with an application to identify a candidate action provided by the application. In an example, the catalogue component 314 may parse 306 an application description 304 of a movie app provided by an app market 302 to identify one or more candidate actions, such as an allow users candidate action, an order movie tickets candidate action, read user reviews candidate action, an order candy candidate action, etc. In another example, the catalogue component 314 may parse 312 an app review 310 of the movie app provided by a website 308 to identify one or more candidate actions, such as the order movie tickets candidate action, an eat too much candy candidate action, etc.

The catalogue component 314 may generate feature vectors for the candidate actions based upon one or more content sources referencing such candidate actions. For example, one or more features may be extracted from a variety of websites and/or other sources that reference the order movie tickets candidate action, the read user reviews candidate action, and/or the order candy candidate action. In contrast, one or more features may be extracted from merely a few content sources that may reference the eat too much candy candidate action and/or the allow users candidate action. The catalogue component 314 may utilize a classifier to determine, based upon the feature vectors, whether respective candidate actions are valid or invalid. For example, the order movie tickets candidate action, the read user reviews candidate action, and/or the order candy candidate action may be determined as valid, while the eat too much candy candidate action and/or the allow users candidate action may be determined as invalid. In this way, the catalogue component 314 may include the order movie tickets candidate action as an order movie tickets action, the read user reviews candidate action as a read user reviews action, and/or the order candy candidate action as an order candy action within the action catalogue 316.

Figure 4:
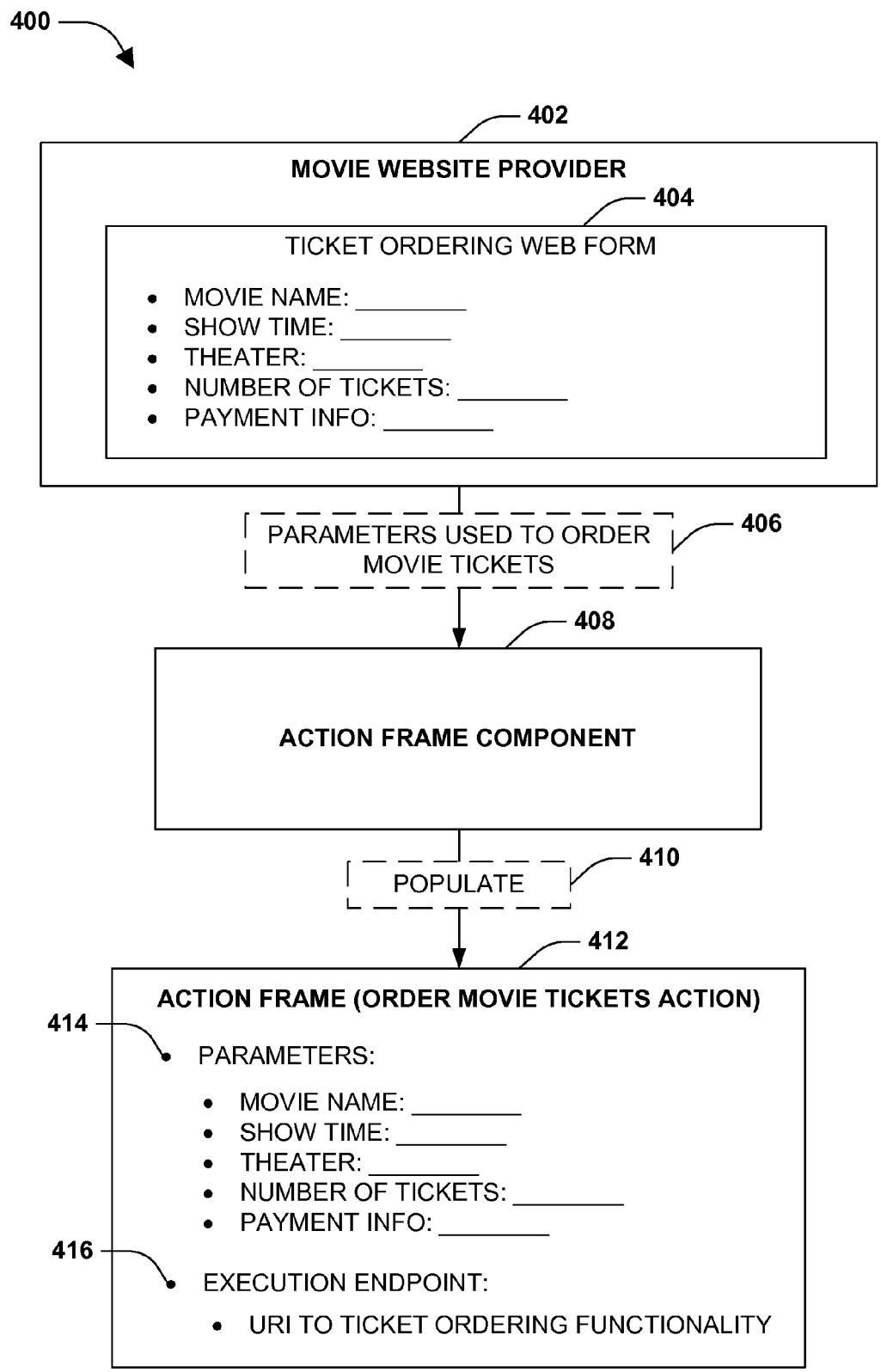
FIG. 4 is a component block diagram illustrating an exemplary system for generating an action frame.

FIG. 4 illustrates an example of a system 400 configured for generating an action frame. The system 400 may comprise an action frame component 408. The action frame component 408 may be configured to generate the action frame, such as an action frame 412 for an order movie tickets action, by populating 410 the action frame 412 with one or more parameters 414 and/or one or more execution endpoints 416. In an example, the action frame component 408 may identify a provider, such as a movie website provider 402, capable of executing the order movie tickets action. The action frame component 408 may determine that the movie website provider 402 provides an action form, such as a ticket ordering web form 404 through which a user may order movie tickets. The action frame component 408 may extract 406 one or more parameters from the ticket order web form 404. For example, the action frame component 408 may extract a movie name parameter, a show time parameter, a theater parameter, a number of tickets parameter, payment info parameter, and/or other parameters used by the ticket ordering web form 404 to execute the order movie tickets action. The action frame component 408 may populate 410 the action frame 412 with the one or more parameters 414. In an example, the action frame component 408 may identify an execution endpoint, such as a universal resource identifier (URI) associated with ticket ordering functionality provided by the movie website provider 402. The action frame component 408 may populate 410 the action frame 412 with an execution endpoint 416 based upon the URI associated with the ticket ordering functionality. In this way, the execution endpoint 416 may be used to access functionality that may execute the order movie tickets action based upon the one or more parameters 414.

Figure 5:
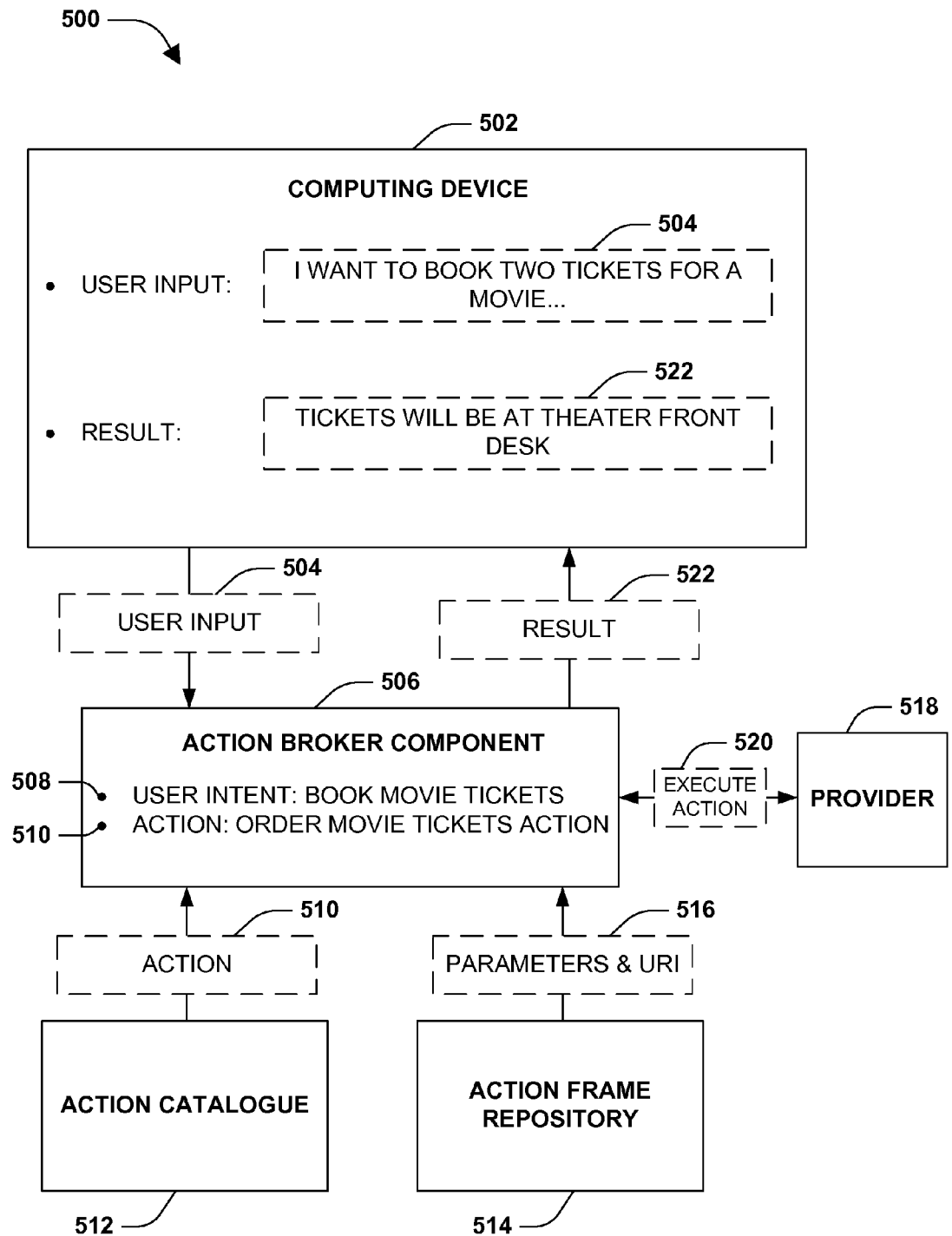
FIG. 5 is a component block diagram illustrating an exemplary system for executing an action.

FIG. 5 illustrates an example of a system 500 configured for executing an action. The system 500 may comprise an action broker component 506. The action broker component 506 may be associated with an action catalogue 512 populated with one or more actions that may be executed. The action broker component 506 may be associated with an action frame repository 514 comprising one or more action frames populated with information, such as one or more parameters and/or one or more execution endpoints, used to execute actions. The action broker component 506 may be configured to execute an action (e.g., on behalf of a user).

In an example of facilitating execution of an action, the action broker component 506 may analyze user input 504 through a computer device 502 to identify a user intent to perform an action. For example, the action broker component 506 may analyze a textual or audio statement "I want to book two tickets for a movie called The Big Movie at 6:00 at the theater in downtown Cleveland using my online payment account having a username and password of . . . " associated with the user input 504 to identify a book movie tickets user intent 508 indicating that the user desires to perform an order movie tickets action 510 populated within the action catalogue 512.

The action broker component 506 may identify an action frame associated with the order movie tickets action 510. The action broker component 506 may extract 516 one or more parameters and/or one or more execution endpoints, used to execute the order movie tickets action 510, from the action frame. A parameter may correspond to information used to execute the order movie tickets action 510 (e.g., a movie name parameter, a show time parameter, a theater parameter, a number of tickets parameter, a payment info parameter, and/or other parameters). An execution endpoint, such as a uniform resource identifier (URI), may be associated with an application programming interface of a provider 518 capable of executing the order movie tickets action 510. Accordingly, the action broker component 506 may invoke the provider 518, using the URI, to execute 520 the order movie tickets action 510 based upon the one or more parameters (e.g., The Big Movie as the movie name parameter, 6:00 as the show time parameter, a downtown Cleveland theater as the theater parameter, 2 as the number of tickets parameter, the online payment account information as the payment info parameter, etc.). In this way, the provider 518 may order two movie tickets (e.g., on behalf of the user). The action broker component 506 may provide a result 522 of the executed action. For example, the result 522 may indicate that the tickets will be at a theater front desk for the user. In this way, an action may be performed on behalf of a user based upon minimal user input, such as the user input 504 and/or additional user input as needed (e.g., a selection of a particular theater, additional user authentication for the online payment account, etc.).

Figure 6:
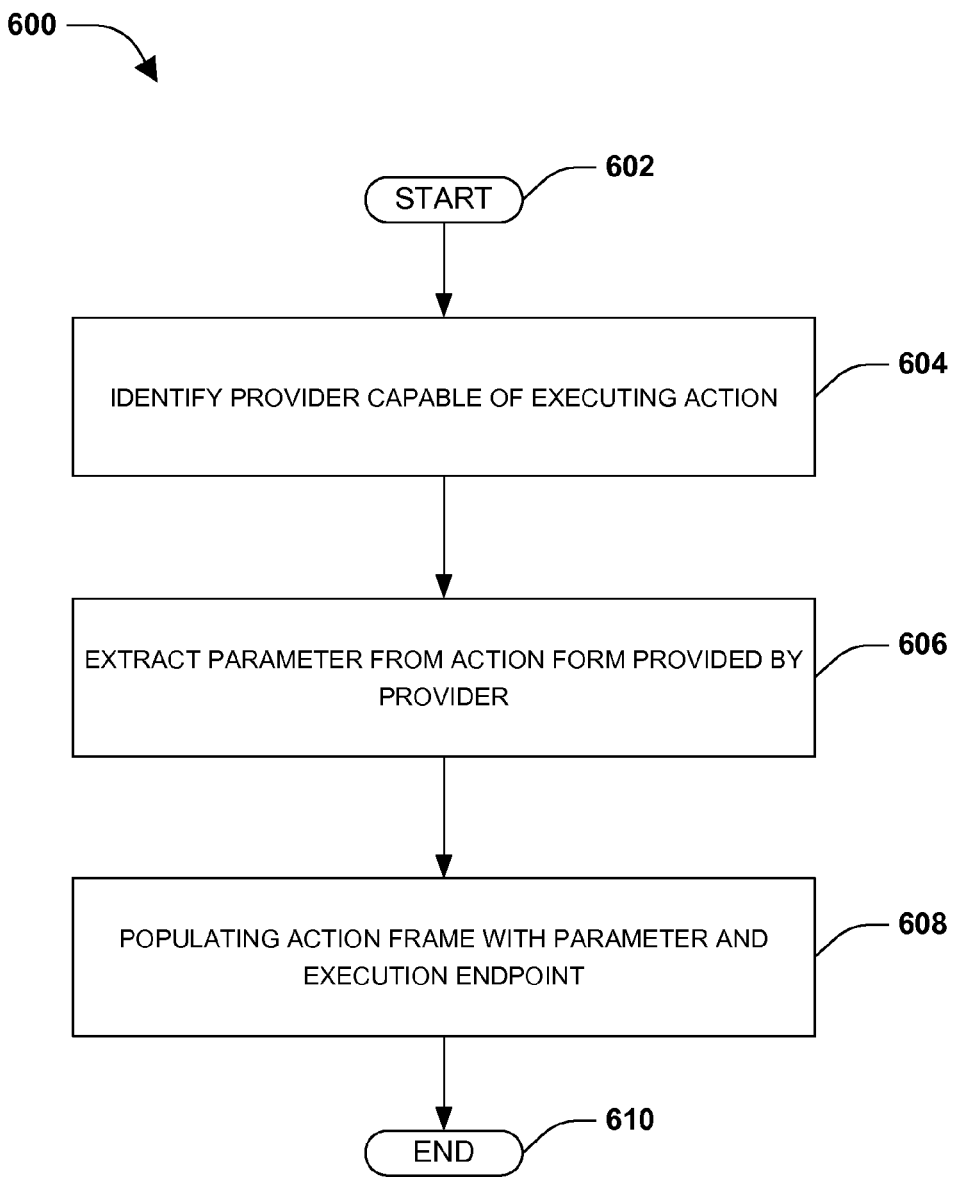
FIG. 6 is a flow diagram illustrating an exemplary method of generating an action frame.

An embodiment of generating an action frame is illustrated by an exemplary method 600 of FIG. 6. At 602, the method starts. At 604, a provider capable of executing an action may be identified. For example, the provider, such as a website or application, may comprise an action form comprising functionality used to execute the action (e.g., a dining website may comprise a table reservation form that may allow users to book a table at a restaurant). In an example, one or more providers may be identified. At 606, one or more parameters may be extracted from an action form provided by the provider. A parameter may correspond to information used to execute the action. For example, a party size parameter may be extracted from the table reservation form. In an example, one or more parameters from one or more providers may be extracted. At 608, an action frame for the action may be populated with the parameter and/or an identifier of the provider (e.g., an execution endpoint uniform resource identifier). In this way, the action frame may be used to identify one or more parameters of the action and/or a provider capable of performing the action. For example, user input may be analyzed to identify a user intent to perform the action (e.g., the user inputs "I want to eat at Mexican Cantina" into a mobile phone). The action frame may be identified based upon the user intent, and values for the one or more parameters within the action frame may be obtained (e.g., a party size of 2 may be obtained based upon the user input, supplemental information, etc.). In this way, the provider may be invoked to execute the action based upon the values of the one or more parameters. At 610, the method ends.

Figure 7:
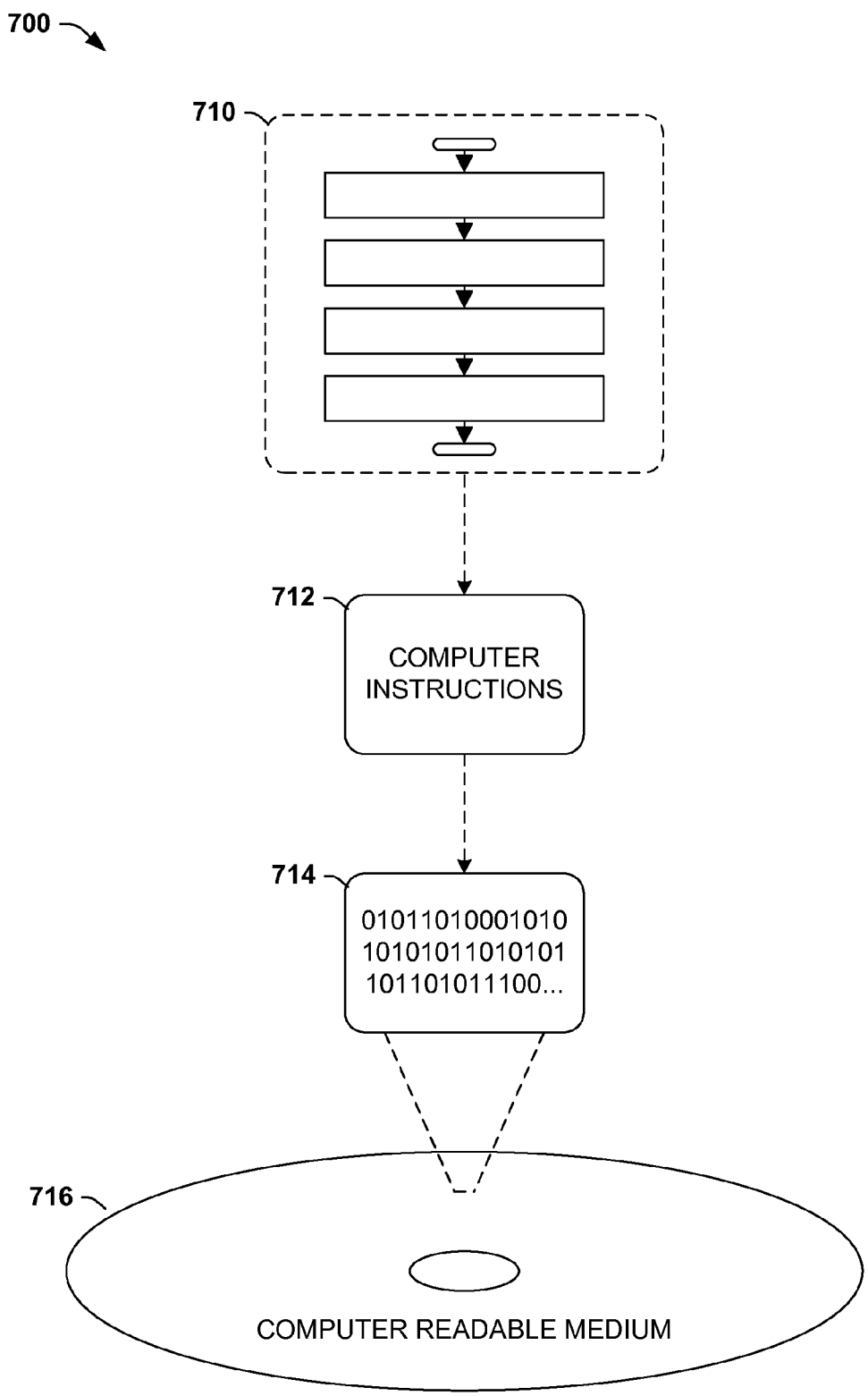
FIG. 7 is an illustration of an exemplary computing device-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 714. This computer-readable data 714 in turn comprises a set of computer instructions 712 configured to operate according to one or more of the principles set forth herein. In one such embodiment 700, the processor-executable computer instructions 712 may be configured to perform a method 710, such as at least some of the exemplary method 100 of FIG. 1, at least some of the exemplary method 200 of FIG. 2, and/or at least some of the exemplary method 600 of FIG. 6, for example. In another such embodiment, the processor-executable instructions 712 may be configured to implement a system, such as at least some of the exemplary system 300 of FIG. 3, at least some of the exemplary system 400 of FIG. 4, and/or at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
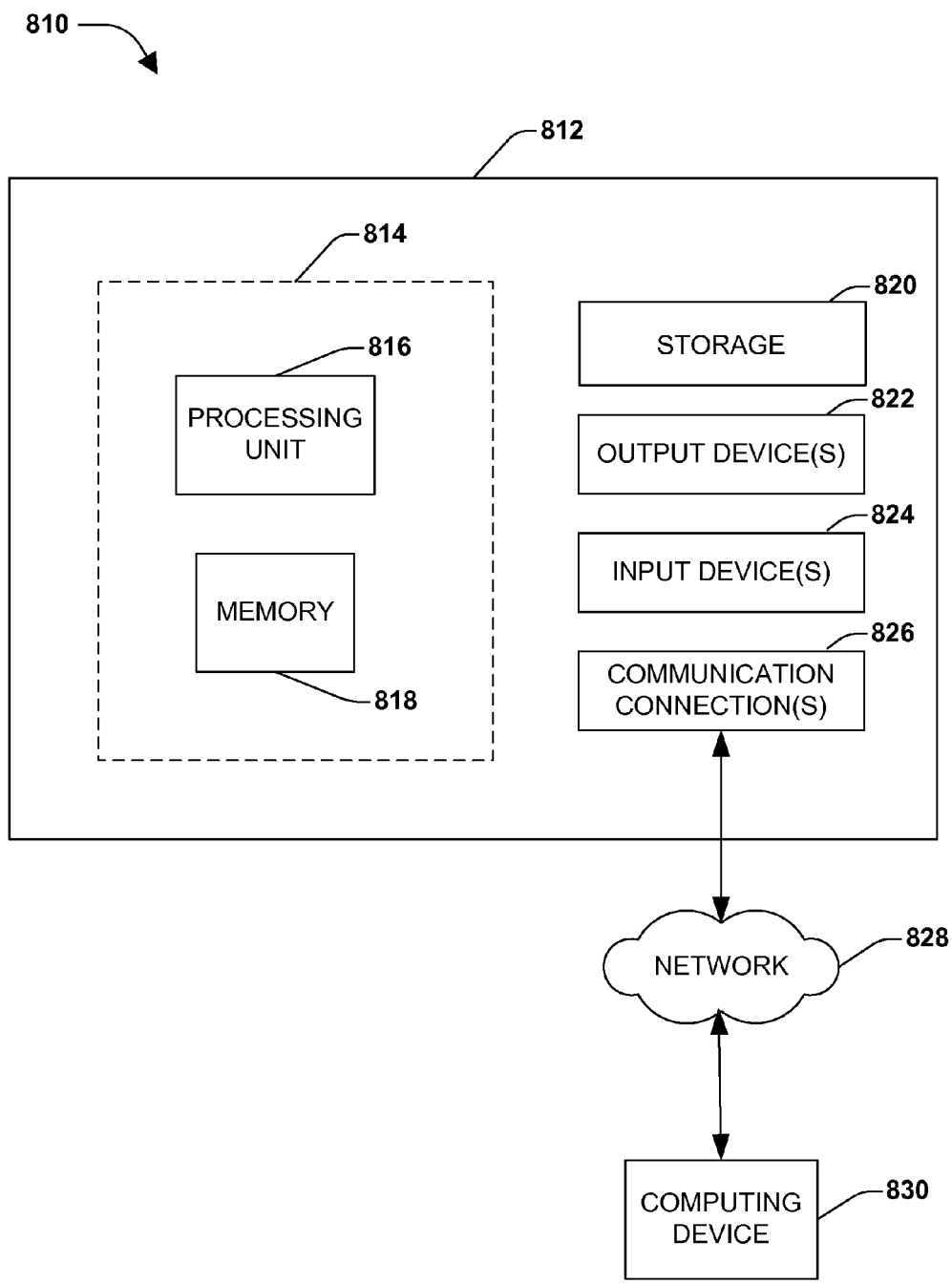
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In an embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In an embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer system, comprising:
   one or more processors; and
   one or more computer-readable media having stored thereon computer-executable instructions that are executable by the one or more processors, and that configure the computer system to provide an action frame utilizing functionality from a plurality of different network-connected computer-executable applications, including computer-executable instructions that configure the computer system to perform at least the following:
   identify a plurality of different network-connected computer-executable applications that are accessible to the computer system;
   generate an action catalog identifying, for each of the plurality of different computer-executable applications, one or more corresponding actions, including, for at least a particular computer-executable application of the plurality of different computer-executable applications:
      parsing one or more descriptive texts corresponding to the particular computer-executable application, to identify at least one particular action that may be provided by the particular computer-executable application; and
      populating the action catalog with the at least one particular action in association with the particular computer-executable application;
   based at least on having generated the action catalog, generate an action frame for each of the one or more actions, each action frame identifying how to invoke a fillable form at a corresponding computer-executable application to carry out a corresponding action, including, for the at least one particular action:
      identifying at least one fillable form of the particular computer-executable application for carrying out the at least one particular action, the at least one fillable form including one or more parameters for receiving user-supplied values to use as part of carrying out the at least one particular action;
      extracting the one or more parameters from the at least one fillable form;
      identifying at least one execution endpoint that is usable for invoking the at least one fillable form of the particular computer-executable application; and
      populating a particular action frame with the one or more parameters and with the at least one execution endpoint;
   subsequent to generating the action frame, identify a user intent to perform the least one particular action;
   based at least on identifying the user intent to perform the at least one particular action, identify the particular action frame; and
   based at least on identifying the particular action frame, invoke the least one execution endpoint over a network using at least one user-supplied value for at least one of the one or more parameters as input to the at least one fillable form.

2. The computer system of claim 1, also including computer-executable instructions that configure the computer system to generate a one or more feature vectors from the one or more actions.

3. The computer system of claim 2, also including computer-executable instructions that configure the computer system to generate a feature vector from an action based at least on there being one or more content sources that reference the action.

4. The computer system of claim 3, also including computer-executable instructions that configure the computer system to generate the feature vector from the action based at least on one or more features extracted from the one or more content sources.

5. The computer system of claim 4, wherein the one or more features are selected from the group comprising a number feature, a category feature, and a binary feature.

6. The computer system of claim 3, wherein the one or more content sources are selected from the group comprising a website, an application marketplace description, a web service, a cloud service, an application, an email, a calendar entry, and a task entry.

7. The computer system of claim 2, also including computer-executable instructions that configure the computer system to utilize a classifier function to determine whether each action is valid or invalid based upon the one or more feature vectors.

8. The computer system of claim 7, also including computer-executable instructions that configure the computer system to determine that an action is valid based upon one or more of (i) a number of features and (ii) a number of feature occurrences associated with one or more content source being above a defined threshold.

9. The computer system of claim 1, also including computer-executable instructions that configure the computer system to identify one or more parts of speech tags selected from the group comprising a noun, a verb, and an adjective when parsing the descriptive text corresponding to each computer-executable application to identify the one or more actions.

10. The computer system of claim 1, also including computer-executable instructions that configure the computer system to identify noun phrases when parsing the descriptive text corresponding to each computer-executable application to identify the one or more actions.

11. The computer system of claim 1, wherein at least one of the computer-executable applications comprises a website.

12. The computer system of claim 1, wherein each of the one or more actions comprise an identified action verb and an identified action object.

13. The computer system of claim 1, wherein an execution endpoint comprises a Uniform Resource Identifier (URI).

14. The computer system of claim 1, also including computer-executable instructions that configure the computer system to rank execution endpoints.

15. The computer system of claim 14, wherein execution endpoints are ranked based on one or more of reliability, functionality robustness, user reviews, trust, marketplace registration, and user preference.

16. A method, implemented at a computer system that includes one or more processors, for providing an action frame utilizing functionality from a plurality of different network-connected computer-executable applications, the method comprising:
  identify a plurality of different network-connected computer-executable applications that are accessible to the computer system;
  generating an action catalog identifying, for each of the plurality of different computer-executable applications, one or more corresponding actions, including, for at least a particular computer-executable application of the plurality of different computer-executable applications:
    parsing one or more descriptive texts corresponding to the particular computer-executable application, to identify at least one particular action to be provided by the particular computer-executable application; and
    populating the action catalog with the at least one particular action in association with the particular computer-executable application;
  based at least on having generated the action catalog, generating an action frame for each of the one or more actions, each action frame identifying how to invoke a fillable form at a corresponding computer-executable application to carry out a corresponding action, including, for the at least one particular action:
    identifying at least one fillable form of the particular computer-executable application for carrying out the at least one particular action, the at least one fillable form including one or more parameters for receiving user-supplied values to use as part of carrying out the at least one particular action;
    extracting the one or more parameters from the at least one fillable form;
    identifying at least one execution endpoint that is usable for invoking the at least one fillable form of the particular computer-executable application; and
    populating a particular action frame with the one or more parameters and with the at least one execution endpoint;
  subsequent to generating the action frame, identify a user intent to perform the least one particular action;
  based at least on identifying the user intent to perform the at least one particular action, identify the particular action frame; and
  based at least on identifying the particular action frame, invoke the least one execution endpoint over a network using at least one user-supplied value for at least one of the one or more parameters as input to the at least one fillable form.

17. The method of claim 16, further comprising generating a one or more feature vectors from the one or more actions.

18. The method of claim 17, further comprising utilizing a classifier function to determine whether each action is valid or invalid based upon the one or more feature vectors.

19. The method of claim 16, wherein at least one of the computer-executable applications comprises a website.

20. A computer program product comprising one or more hardware storage devices having stored thereon computer-executable instructions that are executable by one or more processors of a computer system, and that configure the computer system to provide an action frame utilizing functionality from a plurality of different network-connected computer-executable applications, including computer-executable instructions that configure the computer system to perform at least the following:
  identify a plurality of different network-connected computer-executable applications that are accessible to the computer system;
  generate an action catalog identifying, for each of the plurality of different computer-executable applications, one or more corresponding actions, including, for at least a particular computer-executable application of the plurality of different computer-executable applications:
    parsing one or more descriptive texts corresponding to the particular computer-executable application, to identify at least one particular action to be provided by the particular computer-executable application; and
    populating the action catalog with the at least one particular action in association with the particular computer-executable application;

based at least on having generated the action catalog, generate an action frame for each of the one or more actions, each action frame identifying how to invoke a fillable form at a corresponding computer-executable application to carry out a corresponding action, including, for the at least one particular action:
- identifying at least one fillable form of the particular computer-executable application for carrying out the at least one particular action, the at least one fillable form including one or more parameters for receiving user-supplied values to use as part of carrying out the at least one particular action:
- extracting the one or more parameters from the at least one fillable form;
- identifying at least one execution endpoint that is usable for invoking the at least one fillable form of the particular computer-executable application; and
- populating a particular action frame with the one or more parameters and with the at least one execution endpoint;

subsequent to generating the action frame, identify a user intent to perform the least one particular action;

based at least on identifying the user intent to perform the at least one particular action, identify the particular action frame; and based at least on identifying the particular action frame, invoke the least one execution endpoint over a network using at least one user-supplied value for at least one of the one or more parameters as input to the at least one fillable form.

* * * * *